Jan. 10, 1961 W. C. RIESTER 2,967,514
VALVE MEANS FOR MULTIPLE CARBURETORS
Filed March 12, 1957 2 Sheets-Sheet 1

INVENTOR.
WILLIAM C. RIESTER
BY
Bean Brooks Buckley + Bean
ATTORNEYS

INVENTOR.
WILLIAM C. RIESTER
BY
Bean Brooks Buckley & Bean.
ATTORNEYS

2,967,514
VALVE MEANS FOR MULTIPLE CARBURETORS

William C. Riester, Buffalo, N.Y., assignor to Trico Products Corporation, Buffalo, N.Y.

Filed Mar. 12, 1957, Ser. No. 645,519

2 Claims. (Cl. 12—46.5)

This invention relates to the motor vehicle engine art, and more particularly to an engine having a valve means for a plurality of carburetors.

The modern trend toward increased power in motor vehicle engines has led to a plethora of engine designs, including the use of compound carburetor arrangements. The present invention is concerned with a vehicle engine utilizing three carburetors, one of which is used under normal load requirements, the other two of which are supplemental to the first carburetor when a great increase in power is desired. Briefly, the invention comprises a valve which is adapted to cause operation of two additional carburetors to supply the fuel intake requirement as needed for increased engine power. The valve is arranged for operation by the accelerator rod so that after depression of the accelerator pedal a predetermined amount, the supplemental carburetors will be operated to provide increased engine power output.

The main object of this invention is to provide a motor vehicle engine having a plurality of carburetors with a means for causing carburetor operation to meet power output demand.

Another and more specific object of this invention is to provide a valve means for use on a motor vehicle engine utilizing a plurality of carburetors, which valve means is effective to cause functioning of supplemental carburetors when great increase in power is desired.

These and further objects and features of the invention will become more apparent from the following description and the accompanying drawings wherein.

Figure 1:
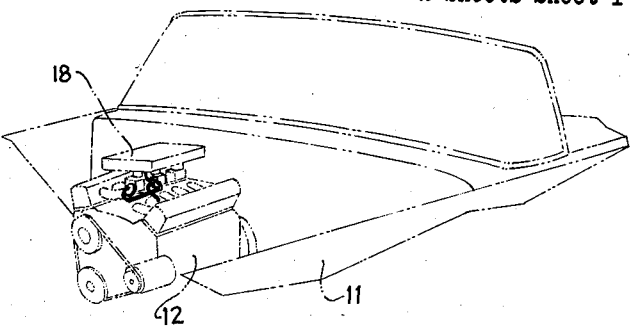
Fig. 1 is a fragmentary view of a motor vehicle having an engine utilizing a plurality of carburetors which are operated by a valve mechanism incorporating the principles of the invention.
Figure 2:
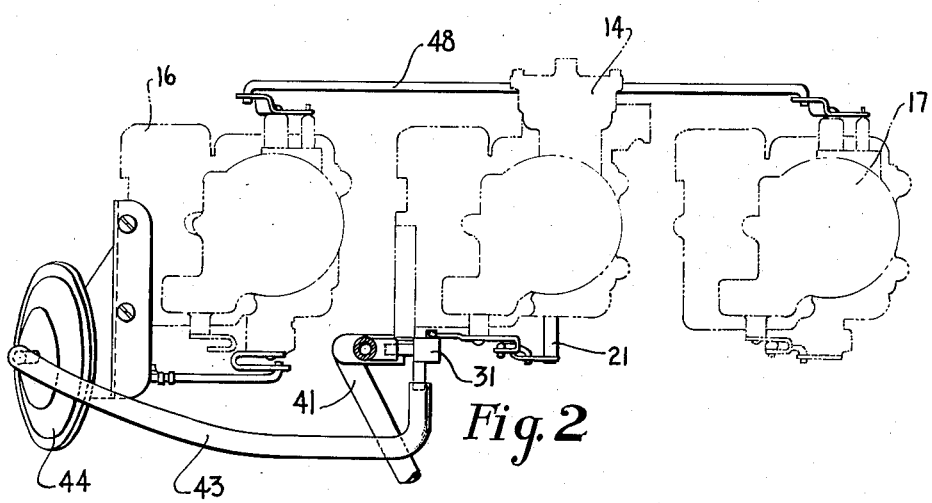
Fig. 2 is a plan view of the carburetor arrangement used in the engine illustrated in Fig. 1.

Referring now to the drawings and more particularly to Fig. 1, the numeral 11 identifies a motor vehicle having an engine 12, which utilizes a carburetor arrangement consisting of three carburetors 14, 16, and 17. The carburetors are connected by duct means (not shown) to an air filter 18 adapted to strain the intake air to the engine.

Figure 3:
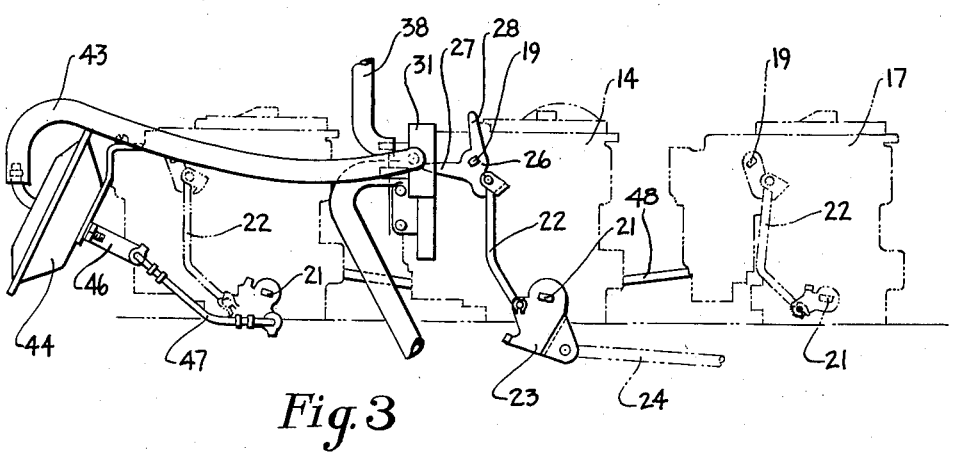
Fig. 3 is side elevation view of the carburetor arrangement shown in Fig. 2.
Figure 4:
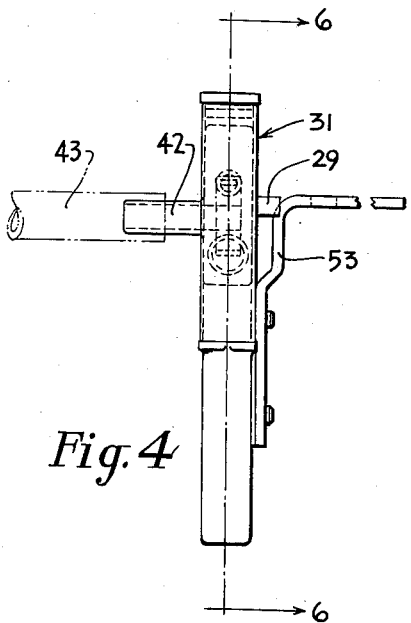
Fig. 4 is an enlarged view of a valve assembly used in the carburetor arrangement of Fig. 2.
Figure 5:
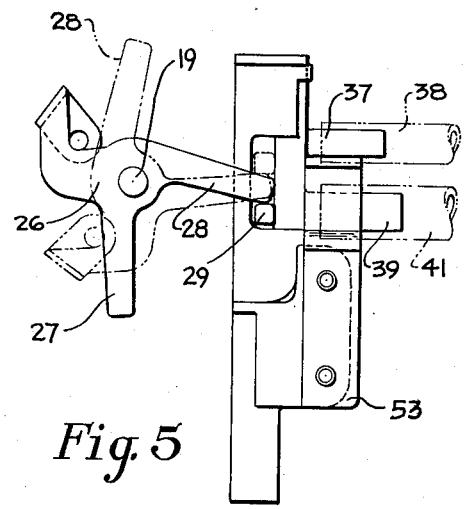
Fig. 5 is a side view of the valve assembly of Fig. 4.

Each carburetor is of the type having butterfly valves mounted upon shafts which extend in a horizontal manner within the carburetor, an upper shaft 19 supporting a choke valve (not shown) while a lower shaft 21 supports a main valve (not shown). Each shaft has a crank affixed to its outer end, said cranks being interconnected by means of a rod 22 so that rotary movement of shaft 19 is synchronized with the rotary movement of the shaft 21, said rotary movement of the shafts being in accordance with desired power output of the engine. Carburetor 14, which is operated for normal power output, has a crank 23 affixed to the main shaft 21, said crank having an accelerator rod 24 connected thereto, the other end of the accelerator rod being tied in with the accelerator pedal (not shown) of the motor vehicle. Affixed to the choke valve shaft 19 of the carburetor 14, is a crank 26 having radial fingers 27 and 28 as illustrated in Fig. 3. The radial fingers of the crank 26 are arranged to engage an arm 29 of a valve assembly 31 which is mounted upon the carburetor 14.

The valve assembly 31 includes a housing 32 provided with a cavity 33 in which is slidably arranged a valve 34 to which the arm 29 is affixed, and a spring loaded plunger 36 which is engaged by the valve 34 when the latter is moved downwardly. The housing 32 has a first nipple 37 to which is connected a hose 38 arranged to connect with the air filter 18 to supply a source of air at atmospheric pressure to the valve assembly 31. A second nipple 39, formed on the housing 32, is arranged for connection with a source of vacuum such as the engine manifold, by way of a hose 41. A third nipple 42 is formed on the housing 32 and is adapted to receive a hose 43 which connects with one side of a vacuum operated mechanism, or motor, 44, which is supported upon the carburetor 16. The mechanism 44 has a diaphragm (not shown), one side of which may be exposed to vacuum, or sub-atmospheric pressure by virtue of connection with hose 43, the other side of which is exposed to atmosphere and has an arm 46 connected to a rod 47, the latter being attached to the crank of the main crankshaft 21 of carburetor 16. The main crankshaft of carburetors 16 and 17 are connected by means of a rod 48, so that rotary movement of the main crankshaft of carburetor 16 will cause similar movement of the main crankshaft of carburetor 17.

Figure 6:
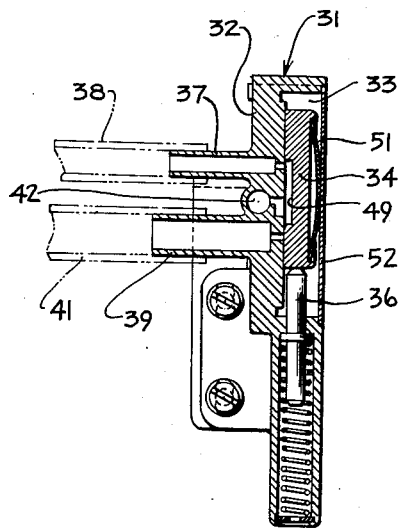
Fig. 6 is a section view of the valve assembly as seen from line 6—6 in Fig. 4.
Figure 7:
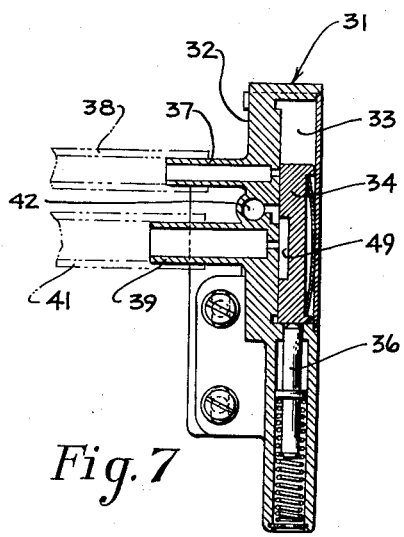
Fig. 7 is a view similar to Fig. 6 but showing the valve assembly in operative position.

As best seen in Figs. 6 and 7, the slide valve has a recess 49 arranged to abridge inner openings of the nipples 37 and 42 in one position of the valve, and to abridge the openings of nipples 39 and 42 in another position of the slide valve 34. A leaf spring 51 is mounted upon the slide valve 34 and engages a cover 52 adapted to enclose the cavity 33, said leaf spring assuring snug engagement between the valve and the surface of the cavity 33 upon which it slides.

It may be mentioned that the valve assembly 31 is affixed to a bracket 53, which is mounted upon the carburetor 14, said valve assembly being vertically adjustable on the bracket so that the proper spatial relationship may be easily achieved between the valve arm 29 and the radial fingers 27 and 28 of the crank 26. It will also be noted that the slide valve 34, when in normal position (Fig. 6), will have clearance at the upper end of the cavity 33, to thus provide for idling speed adjustment of the carburetor 14.

The operation of the valve assembly is as follows: Assuming that the valve assembly is in non-operative position (Fig. 6), air under atmospheric pressure will pass through nipple 37, valve recess 49 and into the nipple 42, and hose 43 to the vacuum mechanism 44, which will thus have atmospheric pressure on each side of its diaphragm resulting in the non-operation of the rod 47 and main shaft 21. As the accelerator rod 24 is moved forward during motor vehicle operation, the crank 23 of the carburetor 14 will be rotated thus causing rotary movement of crank 26 by virtue of the connection rod 22. As the accelerator rod 24 continues to move, the radial finger 28 will eventually engage the arm 29 of the valve and will shift the valve so that connection is made between the vacuum hose 41 and the hose 43. Thus a pressure differential will be applied to the diaphragm of the mechanism 44 causing inward movement of the diaphragm and the rotation of the main crankshaft 21 by virtue of movement of arm 46 which is affixed to connecting rod 47. Rotary movement of the main shaft 21 of carburetor 16 will be transmitted to the main shaft of carburetor 17 via the rod 48. The choke valve shaft 19 of the carburetors 16 and 17 will simultaneously be operated by virtue of rods 22 which connect with the cranks of the main shafts 21. It is thus seen that after a predetermined movement of the accelerator rod 24, the carburetors 16 and 17 will be operated so that engine power output may be substantially increased.

Upon release of the accelerator and movement of the accelerator rod 24 in the opposite direction, it will be seen that the crank 26 will be rotated in the opposite direction thus causing the radial finger 28 to move away from the valve arm 29 and the valve 34 to return to normal position (Fig. 6) by action of the spring loaded plunger 36. Return movement of the valve 34 will be assured, in case the plunger fails to function, by engagement of the radial finger 27 with the valve arm 29. In such position of the valve 34, it will be seen that the pressure differential on the diaphragm of mechanism 44 will be neutralized, and the arm 46 will move to original position, thus rotating the shafts 21 and 19 of the carburetors 16 and 17 so that the operation of these carburetors will be terminated.

The foregoing description has been given in detail without thought of limitation since the inventive principles involved are capable of assuming other physical embodiments without departing from the spirit of the invention and the scope of the appended claims.

What is claimed is:

1. A valve assembly for controlling a plurality of motor vehicle carburetors of the type having fluid pressure responsive actuator means adapted for selective operation of the carburetors, said valve assembly having a first nipple adapted for connection to a fluid pressure responsive carburetor actuator means and second and third nipples adapted for connection to sources of fluids under different pressures, said valve assembly including a housing formed to provide internal passageways for conduction of pressure fluid through the valve assembly, a slide valve movable within said housing between first and second positions for changing the direction of fluid flow through said first nipple, said slide valve having an arm projecting beyond said housing, resilient means constantly urging said slide valve to one of said positions, and a rotatable crank positioned exteriorly of said housing and having a pair of radially arranged fingers for engaging said arm of said slide valve to shift the latter between said first and second positions, said arm being positioned between said fingers with one of said fingers normally engaging said arm when said slide valve is in said one position, and with the other of said fingers normally being spaced from said arm when said slide valve is in said one position for movement relative to said arm into engagement therewith for thereafter shifting said slide valve out of said one position against the urging of said resilient means.

2. A valve assembly for controlling a plurality of motor vehicle carburetors of the type having fluid pressure responsive actuator means adapted for the selective operation of the carburetors, said valve assembly having a first nipple adapted for connection to a fluid pressure responsive carburetor actuator means and second and third nipples adapted for connection to sources of pressure fluids at different pressures, said valve assembly including a housing formed to provide internal passageways for conduction of pressure fluid through the valve assembly, a slide valve movable within said housing between first and second positions for changing the direction of fluid flow through said first nipple, said slide valve having an arm projecting beyond said housing, resilient means urging said slide valve into one of said positions, a rotatable crank having a pair of radially arranged fingers for engaging said arm of said slide valve to shift the latter between said positions, said arm being positioned between said fingers with one of said fingers normally engaging said arm when said slide valve is in said one position, and with the other of said fingers normally being spaced from said arm when said slide valve is in said one position for movement relative to said arm into engagement therewith for thereafter shifting said slide valve out of said one position against the urging of said resilient means and adjustable mounting means for said valve assembly to provide variable spatial adjustment between said arm of said slide valve and said radial fingers of said crank.

References Cited in the file of this patent

UNITED STATES PATENTS

| | | |
|---|---|---|
| 2,105,473 | Dean | Jan. 18, 1938 |
| 2,200,396 | Martin | May 14, 1940 |
| 2,414,260 | Hunter | Jan. 14, 1947 |
| 2,460,046 | Vincent | Jan. 25, 1949 |
| 2,609,806 | Winkler | Sept. 9, 1952 |
| 2,722,207 | Sarto | Nov. 1, 1955 |
| 2,828,767 | Barusch | Apr. 1, 1958 |

FOREIGN PATENTS

| | | |
|---|---|---|
| 179,854 | Great Britain | May 18, 1922 |